Dec. 26, 1944.   H. G. FORTUNE   2,366,017
MEANS FOR CUTTING CASTS
Filed June 13, 1944   2 Sheets-Sheet 1
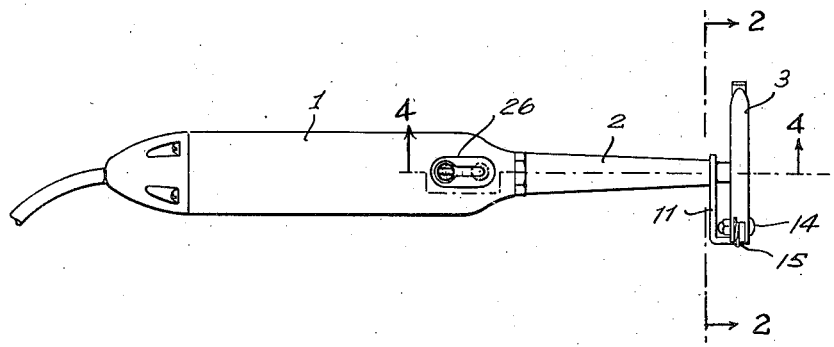
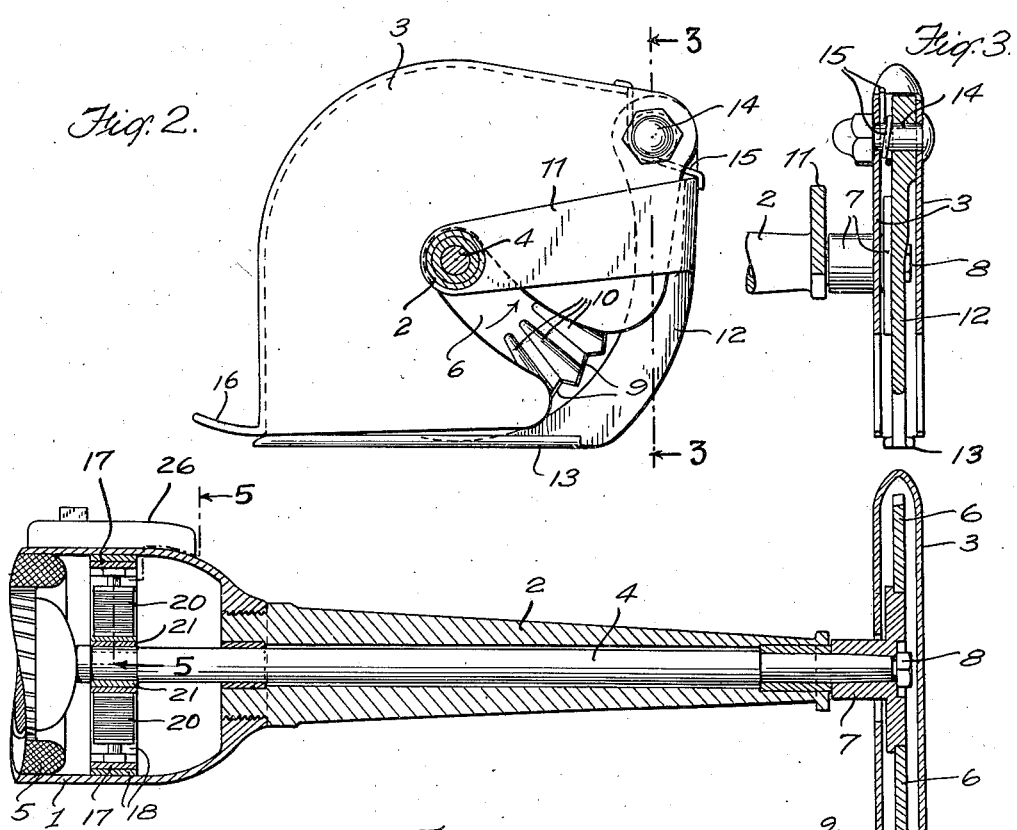
INVENTOR
HAROLD G. FORTUNE
BY Victor D. Borst
ATTORNEY Dec. 26, 1944.  H. G. FORTUNE  2,366,017
MEANS FOR CUTTING CASTS
Filed June 13, 1944  2 Sheets-Sheet 2
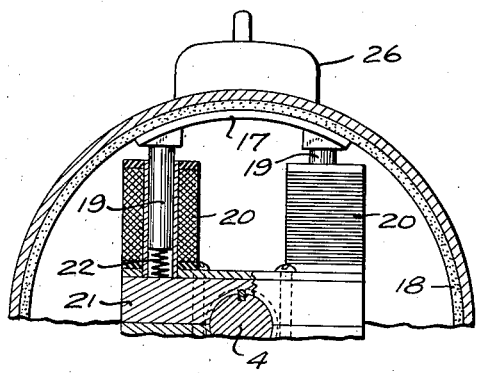
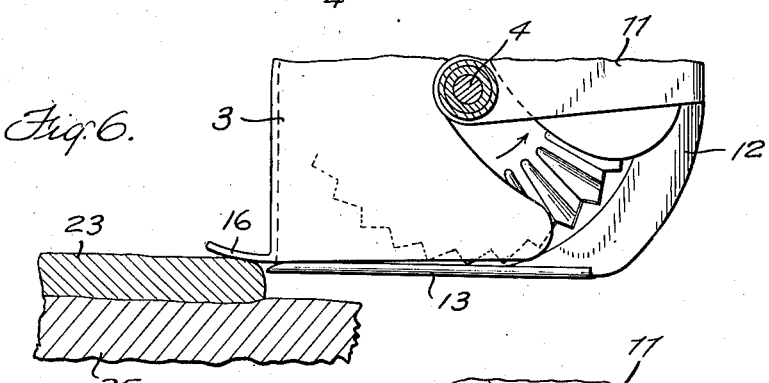
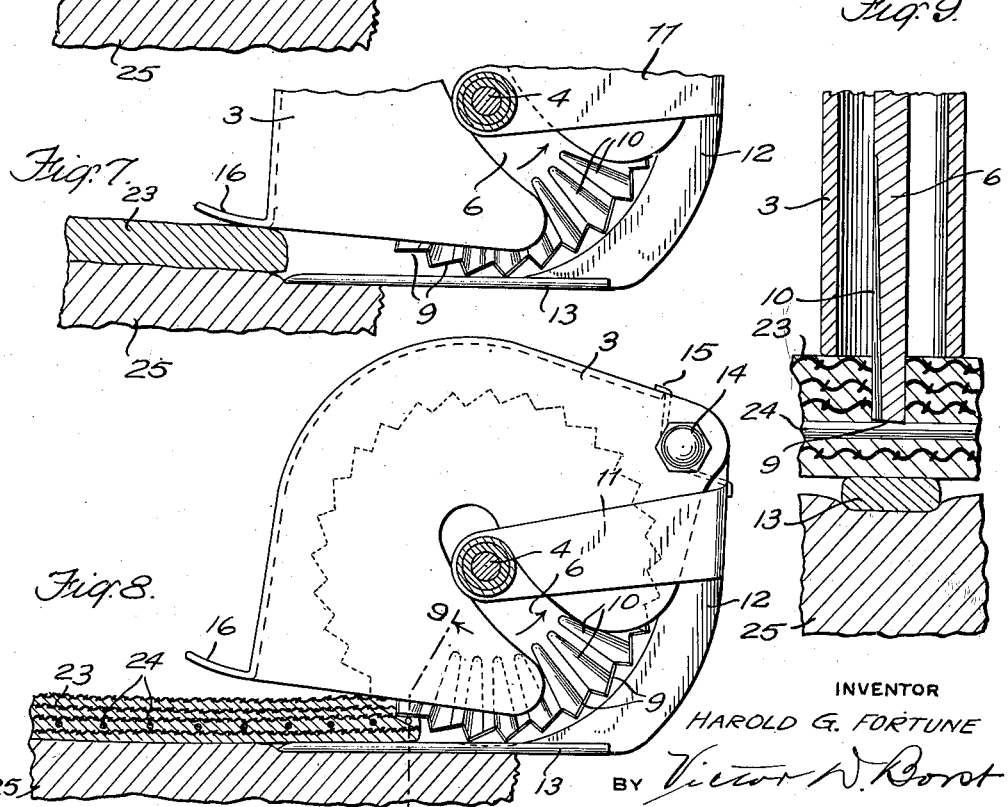
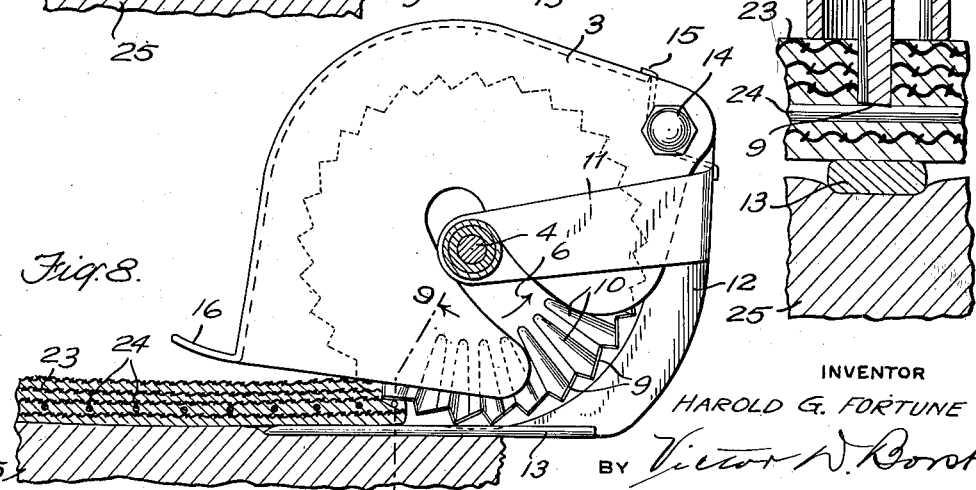
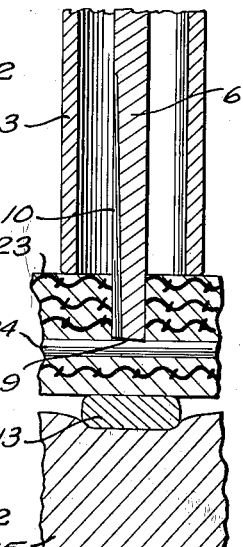
INVENTOR
HAROLD G. FORTUNE
BY
ATTORNEY Patented Dec. 26, 1944

2,366,017

UNITED STATES PATENT OFFICE 2,366,017

MEANS FOR CUTTING CASTS

Harold G. Fortune, Lake Placid, N. Y.

Application June 13, 1944, Serial No. 540,123

5 Claims. (Cl. 30—167)

This invention relates to cutting implements suitable for removing casts, as from bone fractures and sprains. The usual implements for this purpose have been cutters operating on the shear principle, and the removal of casts has been a slow and often a painful operation.

The composition of casts is such as to present a special problem in the use of cutters, which is aggravated by the fact that the limb or other portion of the body surrounded by the cast is apt to be painfully sensitive to the application of any force. Power driven cutters are therefore apt to be out of the question.

I have, however, by this invention, devised a power driven cutter of the circular or rotary saw type which operates very satisfactorily for the purpose. Without special provisions such a saw would immediately dull and over-heat, and of course would be a menace to the patient, likely to cause accidental injuries.

Casts are principally composed of gauze saturated with plaster of Paris. For some fractures it is necessary to reinforce the cast with wire. The difficulty of cutting off such a cast is common knowledge, and the patient is oftentimes subjected to extreme discomfort in the operation.

By my invention the saw is operated at high speed, as high as 17,000 to 19,000 R. P. M., by an electric motor, and is backed up by a slim bar constituting a shoe or ski which is run in between the cast and the flesh. The saw teeth are pitched at such an obtuse angle that they produce a minimum of pull on the cast as the blade wears it way in. Rather do they wear or abrade a path and the impact is received by the shoe and is relatively painless. When a wire is encountered, the blade will sever it without perceptible strain, and the saw can be fed along fast or slowly according to conditions.

The saw is constructed and mounted so as to minimize its tendency to heat. On one side it is relieved by radial grooves running in from the saw teeth and the cutting edges of the teeth are beveled toward the relieved face. Thus the abraded material is forced toward the grooved side and is carried out with a minimum of friction. Besides the saw is so mounted as to provide maximum facility for conducting off the heat induced by the cutting operation.

Specifically the implement is made as a portable unit including the motor, the motor being small and its cylindrical casing or housing being of a size to serve as a handle. A switch is in position to be operated by the thumb, and a solenoid operated brake prevents overrun when the motor circuit is opened.

A hinged cover for the saw acts as a guard, and a spring tends to close the guard upon the shoe. A protruding lip on the guard engages the edge of the cast and opens the guard as the shoe is inserted under the cast, thus exposing just enough of the saw.

Other features of the invention will appear from the following particular description of the illustrated embodiment of the invention.

Fig. 1 is a plan of a complete implement.

Fig. 2 is an enlarged section on line 2—2 of Fig. 1.

Fig. 3 is a transverse section on line 3—3 of Fig. 2.

Fig. 4 is a partial section on line 4—4 of Fig. 1.

Fig. 5 is an enlarged fragmentary section on line 5—5 of Fig. 4.

Fig. 6 is a fragmentary view similar to Fig. 2 showing the implement just ready to be applied.

Fig. 7 is a view similar to Fig. 6 showing the guard raised and the shoe in position to be inserted.

Fig. 8 is a similar view with the device moved up to begin cutting.

Fig. 9 is an enlarged section on line 9—9 of Fig. 8.

The motor housing 1 is of a size and shape to serve as the handle, and has a long neck portion 2 which serves as the bearing for the armature shaft on the end of which is the circular saw protected by the housing 3 pivotally supported on an arm from the neck portion 2.

The armature shaft 4 of the motor 5 bears in suitable bearings in the neck portion 2, and on its outer end is fixed the circular saw 6. The outer end of the shaft 4 is reduced and tapered and fitted on it is a hub member 7 held tight with a nut 8. The hub member has a circular enlarged outer end on which is forced the annular saw 6. The hub is readily conductive of heat and dissipates the heat developed in the saw.

The cutting edges 9 of the saw teeth approximate the tangent, being preferably less than 45° to the tangent, with the result, as shown in Fig. 8, that the cutting action is downward toward the shoe, and very slight pull or tearing action is exerted. Also as shown particularly in Fig. 9, the inner face of the saw is relieved by radial grooves 10 running back from each tooth, and the cutting edges are transversely beveled toward the grooved face. By this expedient the material removed by the cut is cleared without undue heating of the saw.

At its outer end the neck 2 has a rearwardly extending arm 11 to which is attached an arcuate arm 12 disposed at the rear of and in the plane of the saw and of substantially the thickness of the saw. At its bottom end the arm 12 is attached to a flat plate 13 constituting a shoe or ski to insert under a cast. The shoe is grooved, as shown, and the saw teeth at the extreme bottom of the saw enter the groove.

The guard 3 is pivoted to the top end of arm 12 by pivot 14, and a coil spring 15 about the pivot bears with one end on the arm 11 and with the other on the top of guard 3, and thus urges the guard to closed position upon the shoe, as shown in Fig. 2. A lip 16 extends forwardly of the bottom edges of the guard as a means to engage and lift the guard. The guard is provided with an arcuate slot in its inner face to clear the hub 7.

For instantaneously stopping the motor when the circuit is broken, a solenoid controlled brake is provided. This, as shown, consists of two arcuate brake shoes 17 frictionally engageable with a brake lining 18 on the inner face of the motor housing 1. The shoes 17 are each carried by two plungers 19 in solenoids 20 that are connected in circuit with the motor. The solenoids are carried on a split block keyed on the shaft 4, and springs 22 urge the plunger out to braking position.

The action will be apparent from the illustrations and the above description. A typical cast 23 is indicated as reinforced with wire 24 and shown as applied to a portion of a human body, the immediately adjacent flesh of which is indicated at 25. The operator grasps the housing 1 in his hand and places the lip 16 upon the starting edge of the cast, as shown in Fig. 6. The implement is then turned to bring the shoe 13 in the position shown in Fig. 7 ready for insertion under the cast. This movement opens the guard 3 and exposes the saw at its portion adjacent the shoe. At that time or previously the motor circuit is closed by operation of the switch 26 which is preferably of the type commonly used on flashlight casings which may be kept under the control of the thumb or may be slid to a position where it is held closed. The direction of rotation of the saw is indicated by the arrow in certain of the fingers. The shoe 13 is then moved under the cast and cutting starts, as shown in Fig. 8, the implement being advanced as fast as conditions permit. The arm 12 enters into the saw cut as the cutting proceeds. The guard 3 rests upon the cast on opposite sides of the cut and will expose only as much of the saw as the thickness of the cast necessitates.

In starting the motor the armatures of the solenoids 20 are retracted as soon as the switch is closed, thus avoiding any starting drag upon the motor, and conversely the springs 22 apply the brake as soon as the switch is opened, thus effecting instantaneous stopping of the motor.

While I have shown one embodiment of the invention for the purpose of illustration, it will be understood that the invention may be otherwise variously embodied within the spirit and scope of the invention as defined in the following claims.

I claim:

1. A cutting implement for severing casts and the like comprising a portable motor housing having a bearing extension, an electric motor in the housing, a protruding armature shaft for the motor bearing in the extension, a circular saw mounted on the outer end of the shaft, a thin bar constituting a shoe member disposed proximate and substantially tangential to the cutting edge of the saw and adapted to be entered underneath a cast, and means extending from the rear end of the shoe member for attaching it to the housing extension including an arm at the rear of the saw substantially the thickness of the saw and in the plane thereof, the saw being rotated in a direction to move the cutting portion toward the said arm in the plane of the saw and the cutting edges of the teeth being pitched rearwardly to less than a 45° angle with the tangent.

2. A cutting implement for severing casts and the like comprising a portable motor housing having a bearing extension, an electric motor in the housing, a protruding armature shaft for the motor bearing in the extension, a circular saw mounted on the outer end of the shaft, a thin bar constituting a shoe member disposed proximate and substantially tangential to the cutting edge of the saw and adapted to be entered underneath a cast, and means extending from the rear end of the shoe member for attaching it to the housing extension including an arm at the rear of the saw substantially the thickness of the saw and in the plane thereof, the saw being rotated in a direction to move the cutting portion toward the said arm in the plane of the saw, one face of the saw having substantially radial grooves running back from the teeth and the cutting edges of the teeth being beveled toward the grooved face.

3. A cutting implement for severing casts and the like comprising a portable motor housing having a bearing extension, an electric motor in the housing, a protruding armature shaft for the motor bearing in the extension, a circular saw mounted on the outer end of the shaft, a thin bar constituting a shoe member disposed proximate and substantially tangential to the cutting edge of the saw and adapted to be entered underneath a cast, and means extending from the rear end of the shoe member for attaching it to the housing extension including an arm at the rear of the saw substantially the thickness of the saw and in the plane thereof, the saw being rotated in a direction to move the cutting portion toward the said arm in the plane of the saw and the cutting edges of the teeth being pitched rearwardly to less than a 45° angle with the tangent, one face of the saw having substantially radial grooves running back from the teeth and the cutting edges of the teeth being beveled toward the grooved face.

4. A cutting implement for severing casts and the like comprising an elongated motor housing constituting a handle and having a bearing extension, an electric motor in the housing, a protruding armature shaft for the motor bearing in the extension, a circular saw mounted in the outer end of the shaft, a thin bar constituting a shoe member supported by the housing extension proximate and substantially tangential to the cutting edge of the saw and adapted to be entered underneath a cast, a switch on the housing for the motor circuit in position for ready manipulation when held for operation, and brake means operative for instantaneous stopping of the armature when the motor circuit is broken.

5. A cutting implement for severing casts and the like comprising an elongated motor housing constituting a handle and having a bearing extension, an electric motor in the housing, a protruding armature shaft for the motor bearing in the extension, a circular saw mounted in the outer end of the shaft, a thin bar constituting a shoe member supported by the housing extension proximate and substantially tangential to the cutting edge of the saw and adapted to be entered underneath a cast, a switch on the housing for the motor circuit in position for ready manipulation when held for operation, a brake lining in the motor housing, a radially movable brake shoe carried by the armature shaft adapted to engage the brake lining in its outer position, means biasing the brake shoe to its braking position, and a solenoid in circuit with the motor and operative when energized to retract the brake shoe.

HAROLD G. FORTUNE.